(12) United States Patent
Uemura

(10) Patent No.: US 10,973,714 B2
(45) Date of Patent: Apr. 13, 2021

(54) ELECTRICALLY ASSISTED WHEELCHAIR AND CONTROL METHOD FOR ELECTRICALLY ASSISTED WHEELCHAIR

(71) Applicant: YAMAHA HATSUDOKI KABUSHIKI KAISHA, Iwata (JP)

(72) Inventor: Tatsuki Uemura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 392 days.

(21) Appl. No.: 15/756,598

(22) PCT Filed: Sep. 2, 2015

(86) PCT No.: PCT/JP2015/074994
§ 371 (c)(1),
(2) Date: Mar. 1, 2018

(87) PCT Pub. No.: WO2017/037898
PCT Pub. Date: Mar. 9, 2017

(65) Prior Publication Data
US 2018/0185211 A1    Jul. 5, 2018

(51) Int. Cl.
*A61G 5/04* (2013.01)
*A61G 5/02* (2006.01)
*B62D 11/04* (2006.01)

(52) U.S. Cl.
CPC .............. *A61G 5/04* (2013.01); *A61G 5/024* (2013.01); *B62D 11/04* (2013.01);
(Continued)

(58) Field of Classification Search
CPC ..... B60W 2300/38; A61G 5/04; A61G 5/024; A61G 2203/32; A61G 2203/38
See application file for complete search history.

(56) References Cited

U.S. PATENT DOCUMENTS

| 6,230,831 | B1 * | 5/2001 | Ogata | .............. A61G 5/045 |
| | | | | 180/65.1 |
| 2001/0022244 | A1 * | 9/2001 | Takada | .............. A61G 5/047 |
| | | | | 180/65.26 |

(Continued)

FOREIGN PATENT DOCUMENTS

| JP | 2000-014714 A | 1/2000 |
| JP | 2010-193939 A | 9/2010 |

(Continued)

OTHER PUBLICATIONS

Official Communication issued in International Patent Application No. PCT/JP2015/074994, dated Nov. 17, 2015.
(Continued)

*Primary Examiner* — Peter D Nolan
*Assistant Examiner* — Demetra R Smith-Stewart
(74) *Attorney, Agent, or Firm* — Keating and Bennett, LLP

(57) ABSTRACT

An electrically assisted wheelchair includes a controller that obtains an inclination assist value by correcting the assist value when a road surface is inclined in a left-right direction of the seat, and performs a downhill turning preventing operation of causing the wheelchair body to travel straight by applying right auxiliary power and left auxiliary power corresponding to the inclination assist value. The controller adjusts the right auxiliary power and the left auxiliary power by correcting the inclination assist value based on a hand rim operation of the user to operate at least one of the right hand rim and the left hand rim in the downhill turning preventing operation.

12 Claims, 10 Drawing Sheets

(52) U.S. Cl.
CPC ...... *A61G 2203/32* (2013.01); *A61G 2203/38* (2013.01); *B60W 2300/38* (2013.01)

(56) References Cited

U.S. PATENT DOCUMENTS

| | | | |
|---|---|---|---|
| 2005/0121866 A1 | 6/2005 | Kamen et al. | |
| 2010/0305841 A1* | 12/2010 | Kajima | A61G 5/043 |
| | | | 701/124 |
| 2011/0015842 A1* | 1/2011 | Kume | B62B 5/0026 |
| | | | 701/67 |
| 2012/0067662 A1 | 3/2012 | Birmanns et al. | |
| 2013/0138315 A1* | 5/2013 | Lee | B60T 7/12 |
| | | | 701/70 |

FOREIGN PATENT DOCUMENTS

| | | |
|---|---|---|
| JP | 5243795 B2 | 7/2013 |
| JP | 2015-013009 A | 1/2015 |
| JP | 2015-024011 A | 2/2015 |
| JP | 2015-027185 A | 2/2015 |
| WO | 2014/041683 A1 | 3/2014 |

OTHER PUBLICATIONS

Kim et al., "Human Friendly Yaw Motion Control for Power Assist Wheelchair", IEE—Japan Industry Applications Society Conference, vol. 2, 2011, 4 pages.

Kim et al., "One-handed Propulsion Control of Power-assisted Wheelchair with Advanced Turning Mode", 6 pages.

Kim et al., "Yaw Motion Control of Power-assisted Wheelchairs under Lateral Disturbance Environment", 6 pages.

\* cited by examiner

319(320)

ELECTRICALLY ASSISTED WHEELCHAIR AND CONTROL METHOD FOR ELECTRICALLY ASSISTED WHEELCHAIR

BACKGROUND OF THE INVENTION

1. Field of the Invention

The present invention relates to an electrically assisted wheelchair that assists the travel of the wheelchair according to the operation of hand rims on the left and right wheels by a user and a control method therefor.

2. Description of the Related Art

Electrically assisted wheelchairs have been conventionally provided as a means to move people who are disabled in walking. An electrically assisted wheelchair that assists the travel of the wheelchair by causing motors installed inside left and right wheels to generate torques based on the operation of hand rims of left and right wheels by a user is known as one mode. Specifically, an assist operation is performed based on torques input by the operation of the left and right hand rims. However, depending on a road surface condition, the electrically assisted wheelchair sometimes makes a motion different from the one intended by the user. For example, a problem of so-called downhill turning may occur on inclined road surfaces and uneven road surfaces.

Accordingly, there has been proposed a technology for estimating a disturbance value corresponding to a road surface condition and controlling assistance amounts of left and right wheels based on this disturbance value (see, for example, Kayoung Kim et al., "Human Friendly Yaw Motion Control in Power Assist Wheelchair", IEE-Japan Industry Applications Society Conference in 2010, Vol. 2, pp. 11-603 to 11-606, 2011). Further, it is also proposed to apply, for example, the technology described in JP 2015-27185A, i.e., a technology for executing a feedforward control based on a roll angle of a wheelchair body or a feedback control based on actual numbers of revolutions of left and right drive wheels to the above electrically assisted wheelchair.

It is assumed that torques are input through hand rims of the electrically assisted wheelchair at suitable timings and with suitable magnitudes according to a road surface condition. However, it is difficult for a user to constantly operate the left and right hand rims at optimal timings and with optimal magnitudes. If the timings or the magnitudes deviate, a control unit of the electrically assisted wheelchair may judge a turning command and perform an assist operation different from the one intended by the user.

SUMMARY OF THE INVENTION

Preferred embodiments of the present invention provide electrically assisted wheelchairs that assist the travel of the wheelchairs according to the operation of hand rims of left and right wheels by a user to operate in a manner closer to the user's intention.

According to a preferred embodiment of the present invention, an electrically assisted wheelchair includes a wheelchair body including a seat on which a user sits; a right drive that applies apply right auxiliary power to a right wheel located to the right of the seat by the operation of a right hand rim by the user; a left drive that applies left auxiliary power to a left wheel located to the left of the seat by the operation of a left hand rim by the user; and a controller configured or programmed to calculate an assist value for the right wheel and the left wheel and determine the right auxiliary power and the left auxiliary power; wherein the controller is further configured or programmed to obtain an inclination assist value by correcting the assist value when a road surface is inclined in a left-right direction of the seat and perform a downhill turning preventing operation to cause the wheelchair body to travel straight by applying the right auxiliary power and the left auxiliary power corresponding to the inclination assist value; and to adjust the right auxiliary power and the left auxiliary power by correcting the inclination assist value based on a hand rim operation of the user operating at least one of the right hand rim and the left hand rim in the downhill turning preventing operation.

Another preferred embodiment of the present invention includes a control method for an electrically assisted wheelchair that assists a travel of a wheelchair body by calculating an assist value based on an operation of a right hand rim and a left hand rim located to the right and left of a seat of the wheelchair body by a user seated on the seat and respectively applying right auxiliary power and left auxiliary power corresponding to the assist value to a right wheel and a left wheel, and including obtaining an inclination assist value by correcting the assist value when a road surface is inclined in a left-right direction of the seat; performing a downhill turning preventing operation to cause the wheelchair body to travel straight on the inclined road surface by applying the right auxiliary power and the left auxiliary power corresponding to the inclination assist value; and correcting the inclination assist value based on a hand rim operation of the user operating at least one of the right hand rim and the left hand rim in the downhill turning preventing operation.

As described above, since the assist value is corrected according to the operation of the user operating at least one of the right hand rim and the left hand rim in the downhill turning preventing operation, even if a timing or magnitude of the hand rim operation deviates between the left and right sides, the influence thereof is significantly reduced or prevented. As a result, the electrically assisted wheelchair is operated in a manner closer to the user's intention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
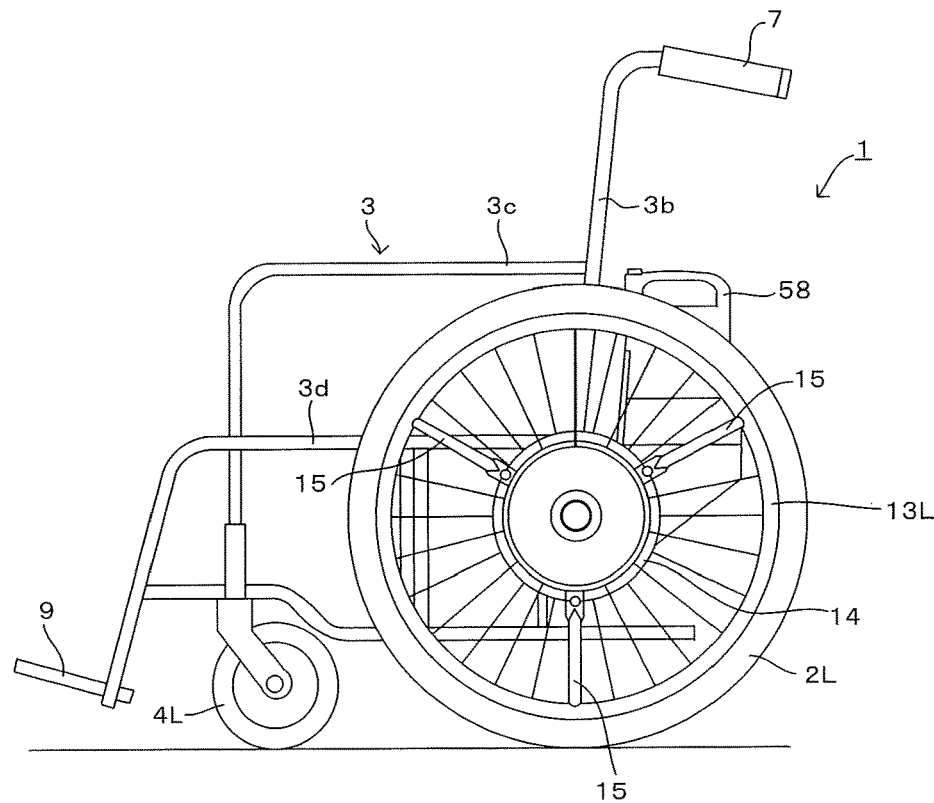
FIG. 1 is a side view showing an electrically assisted wheelchair according to a first preferred embodiment of the present invention.
Figure 2:
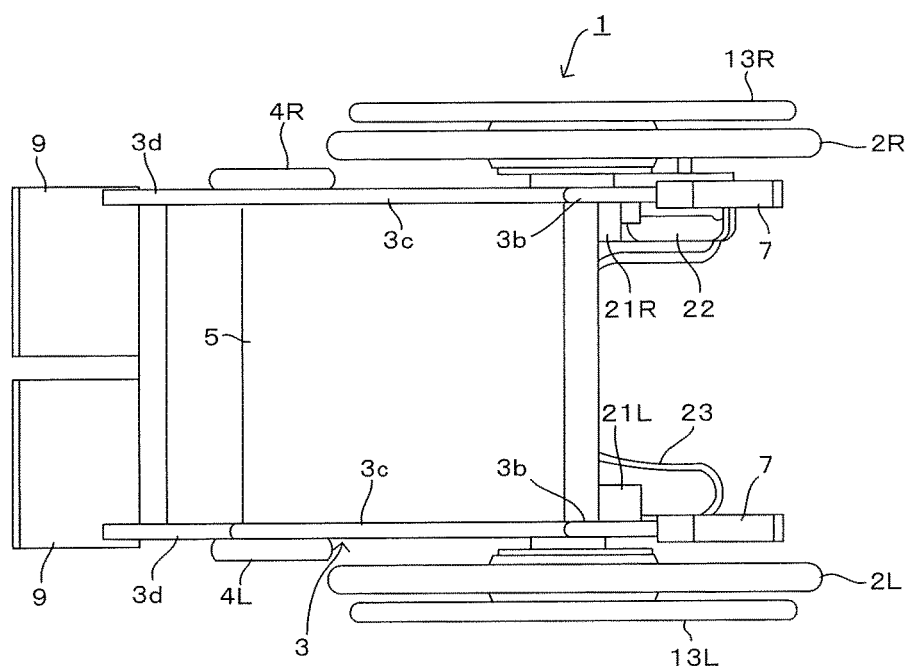
FIG. 2 is a plan view of the electrically assisted wheelchair of FIG. 1.
Figure 3:
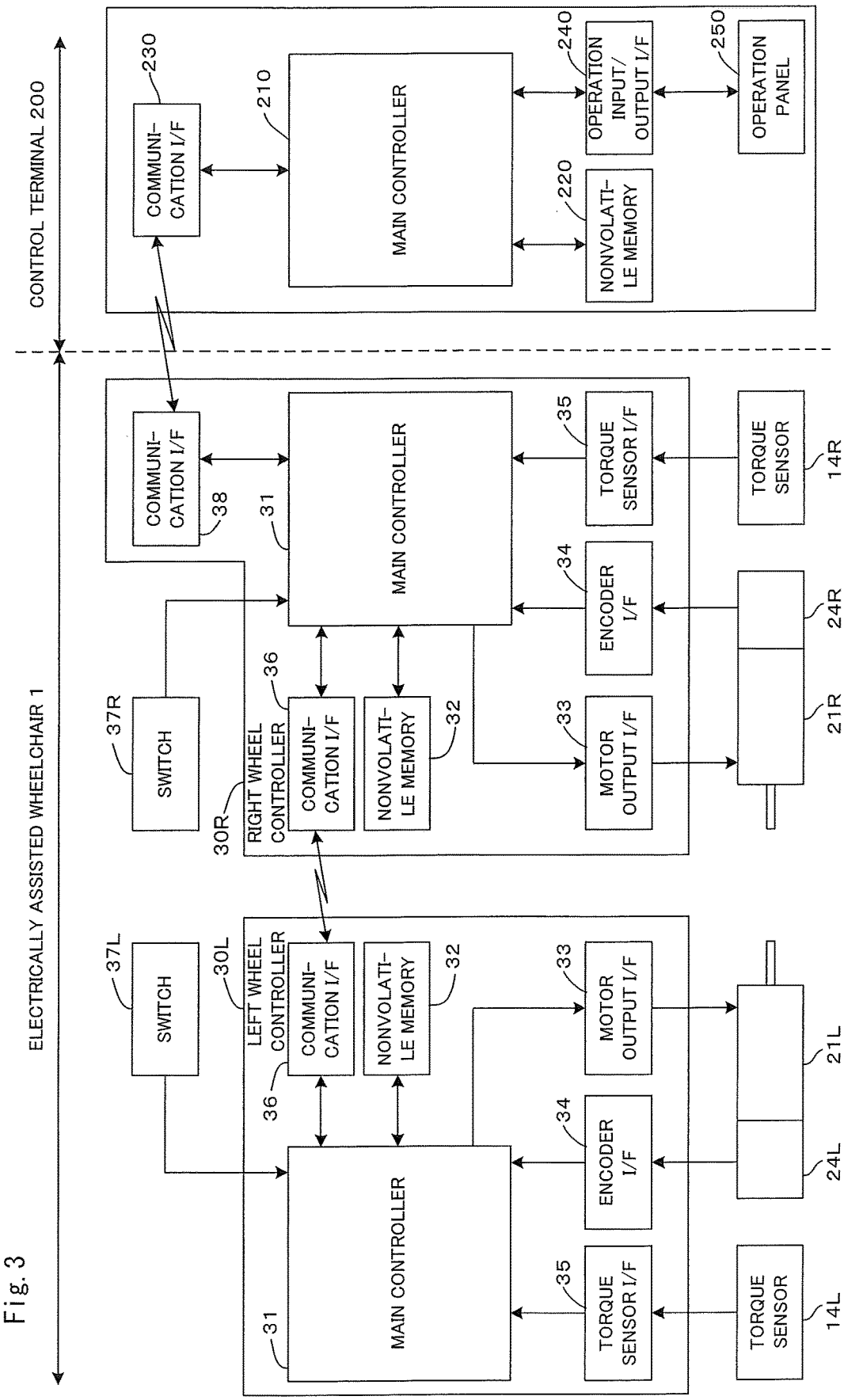
FIG. 3 is a block diagram showing electrical configurations of the electrically assisted wheelchair of FIG. 1 and a control terminal of the wheelchair.

FIG. 1 is a side view showing an electrically assisted wheelchair according to a first preferred embodiment of the present invention. FIG. 2 is a plan view of the electrically assisted wheelchair of FIG. 1. FIG. 3 is a block diagram showing electrical configurations of the electrically assisted wheelchair of FIG. 1 and a control terminal of the wheelchair. The electrically assisted wheelchair (hereinafter, merely referred to as the "wheelchair") 1 may be obtained by installing a power assist system in an existing foldable manual wheelchair. The wheelchair 1 includes a pair of left and right wheels 2L, 2R, a pipe frame 3, and a pair of left and right casters 4L, 4R.

A fabric seat 5 (see FIG. 2) extends across a central portion of the frame 3, and a user sits on the seat 5. The frame 3 includes a plurality of arms. Among those, a pair of left and right handle arms 3b are located in a rear portion of the frame 3. An upper end portion of each handle arm 3b is bent rearwardly and a grip 7 for a caregiver is attached to the bent portion.

An arm 3c horizontally extends forwardly of a wheelchair body from an intermediate height position of each handle arm 3b. Front end portions of a pair of left and right arms 3c are bent substantially at a right angle and extend vertically downward. The casters 4L, 4R are respectively rotatably supported on lower end portions of the left and right arms 3c.

A pair of left and right arms 3d are located below the left and right arms 3c. A front portion of each arm 3d extends obliquely downward toward the front side of the wheelchair body and a step 9 is attached to each extending end (front end portion). In this way, a pair of left and right steps 9 are provided and function as footrests for the user.

The wheels 2L, 2R are respectively detachably attached to left and right portions of the frame 3 behind the casters 4L, 4R, and movably support the frame 3 in cooperation with the casters 4L, 4R. Although not shown, each wheel 2L, 2R is rotatably supported via a ball bearing on an axle supported on boss portions welded to the frame 3.

A ring-shaped hand rim 13L is provided outside the wheel 2L to enable a manual operation of the wheel 2L by the user. Further, a torque sensor 14L is provided which detects a torque applied to the wheel 2L by the operation of the left hand rim 13L by the user, and a signal corresponding to a torque value is output to a left wheel controller 30L (FIG. 3) that controls the left wheel 2L. On the other hand, a drive motor (auxiliary power supply) 21L that applies auxiliary power to the wheel 2L and the left wheel controller 30L are provided inside the wheel 2L. The left wheel controller 30L controls the drive motor 21L to adjust the auxiliary power applied to the wheel 2L. Note that, similarly to the wheel 2L, a hand rim 13R is provided to enable a manual operation of the wheel 2R by the user and a drive motor 21R and a right wheel controller 30R (FIG. 3) are provided inside the wheel 2R to enable and adjust auxiliary power to the wheel 2R. Further, a torque applied to the wheel 2R when the user manually operates the hand rim 13R is detected by a torque sensor 14R and a signal corresponding to the detection value is output to the right wheel controller 30R. Note that since the details of a mounting structure of the hand rim and the drive motor on the wheel are known, this structure is not described here.

To supply power to the drive motors 21L, 21R and the wheel controllers 30L, 30R, a battery 22 is installed in the wheelchair 1. In this preferred embodiment, the battery 22 is detachably attached at a location near the wheel 2R and directly supplies power to the drive motor 21R and the right wheel controller 30R. Further, a wiring harness 23 is disposed on the wheelchair body (frame) 3 from the side of the wheel 2R to the side of the wheel 2L and the battery 22 supplies power to the drive motor 21L and the left wheel controller 30L via the wiring harness 23.

Next, the left and right wheel controllers 30L, 30R are described with reference to FIG. 3. The right wheel controller 30R is described after the left wheel controller 30L is described. The left wheel controller 30L includes a main controller 31, a nonvolatile memory 32, a motor output I/F 33, an encoder I/F 34, a torque sensor I/F 35 and a communication I/F 36 that communicates with the right wheel controller 30R. The main controller 31 includes, for example, a computer including a CPU and the like, that calculates an assist value based on a program and data stored in the nonvolatile memory 32 and operates the drive motor 21L based on the calculated assist value. Note that, in this preferred embodiment, the left wheel controller 30L corrects an estimated disturbance value based on a hand rim operation of the user rather than merely using the estimated disturbance value to prevent downhill turning. Then, the assist value is corrected by subtracting the corrected estimated disturbance value from the above calculated assist value and the drive motor 21L is controlled via the motor I/F 33 to obtain auxiliary power equivalent to the assist value.

Further, in this preferred embodiment, the main controller 31 is able to receive a signal output from an encoder 24L attached to the drive motor 21L via the encoder I/F 34 to highly accurately control the drive motor 21L. The encoder 24L may be a built-in type in the drive motor 21L or an external type.

Further, although the main controller 31 detects a speed of the wheel L, i.e., a wheel speed based on the signal from the encoder 24L in this preferred embodiment, a sensor that directly detects the rotation of the wheel 2L and outputs a signal may be separately provided and the wheel speed may be obtained based on the signal from this sensor.

The main controller 31 receives a signal output from the torque sensor 14L via the torque sensor I/F 35 and precisely detects the torque applied to the wheel 2L by the operation of the left hand rim 13L. Note that reference sign 37L in FIG. 3 denotes a switch for the left wheel controller 30L.

The right wheel controller 30R basically has the same structure as the left wheel controller 30L except that a communication I/F 38 that communicates with the control terminal 200 is additionally provided. Specifically, a main controller 31 of the right wheel controller 30R detects a torque applied to the wheel 2R by the operation of the right hand rim 13R based on a signal output from the torque sensor 14R and detects a wheel speed of the wheel 2R based on a signal from an encoder 24R. Note that reference sign 37R in FIG. 3 denotes a switch for the right wheel controller 30R. Further, in this specification, the wheels 2R, 2L are merely referred to as the "wheels 2" when being described without distinction, the hand rims 13R, 13L are merely referred to as the "hand rims 13" when being described without distinction, the torque sensors 14R, 14L are merely referred to as the "torque sensors 14" when being described without distinction, the drive motors 21R, 21L are merely referred to as the "drive motors 21" when being described without distinction, the encoders 24R, 24L are merely referred to as the "encoders 24" when being described without distinction, and the right and left wheel controllers 30R, 30L are merely referred to as the "wheel controllers 30" when being described without distinction.

Further, the right and left wheel controllers 30R, 30L include the communication I/Fs 36 that bidirectionally communicate with each other. Furthermore, the right wheel controller 30R bidirectionally communicates with the control terminal 200 via the communication I/F 38. Thus, torques applied to the wheels 2 by the operation of the hand rims 13, torques applied to the wheels 2 by the drive motors 21, and the wheel speeds of the respective wheels 2 are commonly used by the right and left wheel controllers 30R, 30L and the wheel controllers 30 control the travel of the wheelchair body based on these inputs.

Further, the wheelchair 1 communicates with the control terminal 200 via the right wheel controller 30R as shown in FIG. 3. Here, a personal computer (PC), a cellular phone, a smartphone or the like may be used as the control terminal 200. The control terminal 200 includes a main controller 210, a nonvolatile memory 220, a communication I/F 230, an operation input/output I/F 240, and an operation panel 250 such as a touch panel. The main controller 210 includes, for example, a computer including a CPU and the like and operates in accordance with a program stored in the nonvolatile memory 220 and information necessary for the control of the wheelchair 1.

Figure 4:
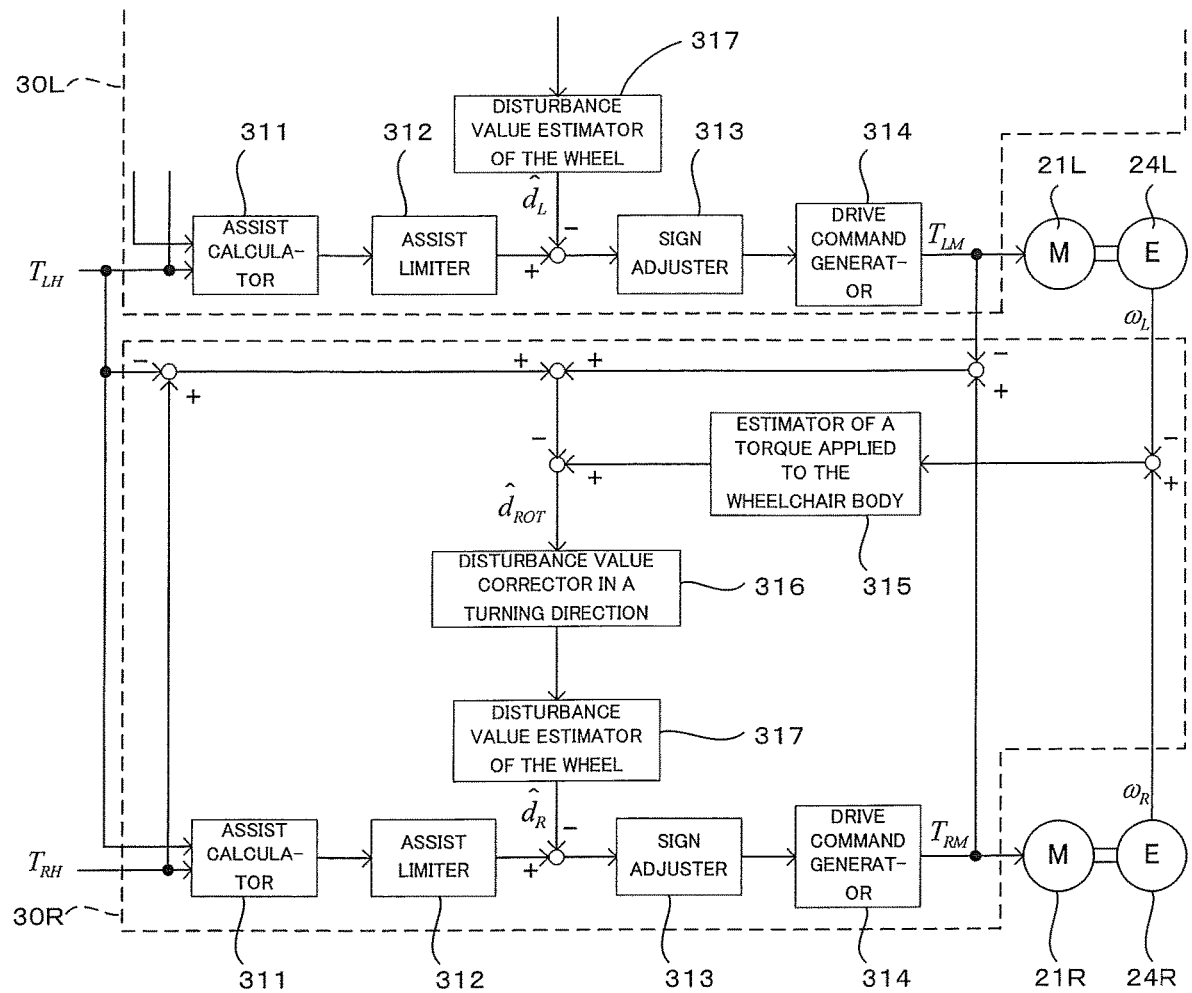
FIG. 4 is a block diagram of a controller of the wheelchair.
Figure 5:
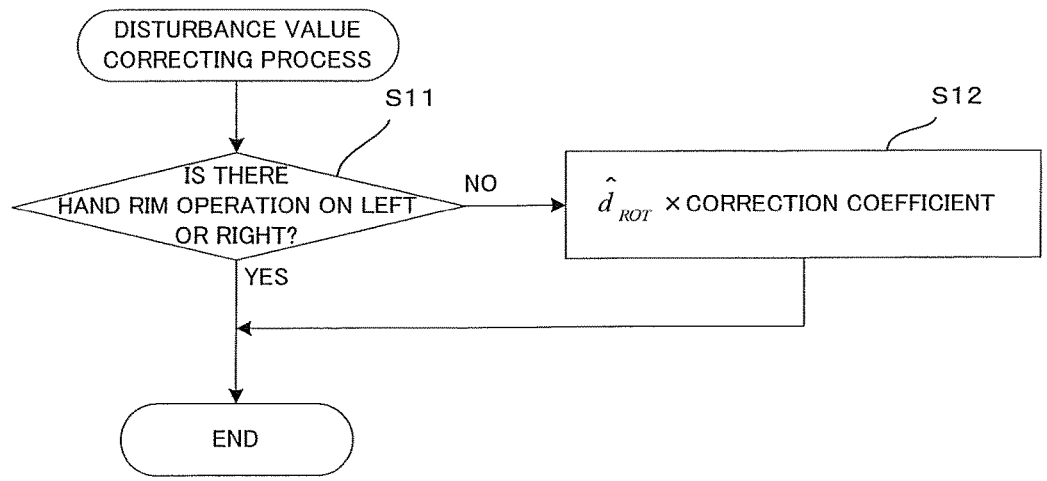
FIG. 5 is a flow chart showing a disturbance value correcting process in a turning direction.

In the wheelchair 1 described above, the motors 21 disposed inside the left and right wheels 2 generate torques according to the operation of the hand rims 13 by the user to assist the travel of the wheelchair 1, and solve a problem of downhill turning by performing a downhill turning preventing operation shown in FIGS. 4 and 5. The first preferred embodiment of the present invention is described in detail below with reference to FIGS. 4 and 5.

FIG. 4 is a block diagram of the controllers. Further, FIG. 5 is a flow chart showing a disturbance value correcting process in a turning direction. Note that although the right wheel controller 30R is mainly shown in FIG. 4, the left wheel controller 30L is basically the same as the right wheel controller 30R. The right wheel side is described in detail below and the left wheel side is denoted by the same or corresponding reference signs and not described.

In the right wheel controller 30R, the main controller 31 is configured or programmed to define and function as an assist calculator 311, an assist limiter 312, a sign adjuster 313, a drive command generator 314, an estimator of a torque applied to the wheelchair body (hereinafter, merely referred to as the "torque estimator") 315 and a disturbance value corrector in a turning direction (hereinafter, merely referred to as the "disturbance value corrector") 316 and a disturbance value estimator of the wheel (hereinafter, merely referred to as the "disturbance value estimator") 317 based on a program and data stored in the nonvolatile memory 32.

The assist calculator 311 calculates an assist value for the wheel 2R based on a torque $T_{RH}$ applied to the wheel 2R by the operation of the right hand rim 13R and a torque $T_{LH}$ applied to the wheel 2L by the operation of the left hand rim 13L, and outputs the calculated assist value to the assist limiter 312. Note that the torque $T_{RH}$ is directly provided from the torque sensor 14R via the torque sensor I/F 35, whereas the torque $T_{LH}$ is provided from the left wheel controller 30L via the communication I/Fs 36.

The assist limiter 312 judges whether or not the assist value calculated in the assist calculator 311 is within an assist range set in advance. This is because an upper limit value to the auxiliary power, which is applied to the wheel 2R, exists due to factors such as an output limit, a temperature and the like of the drive motor 21R. Accordingly, by providing the assist limiter 312 in this preferred embodiment, the value calculated in the assist calculator 311 is used as it is as the assist value if the calculated assist value does not exceed the upper limit value, whereas the upper limit value is rewritten as a new assist value if the upper limit value is exceeded.

If the assist value is obtained in this way, the drive command generator 314 provides a drive command signal corresponding to the assist value to the drive motor 21R to drive the right wheel 2R after a sign of the assist value is adjusted in the signal adjuster 313. Note that the left and right wheels 2L, 2R are mirror-symmetrically arranged across the seat 5 in the wheelchair 1. Thus, the sign adjuster 313 is provided considering that the other wheel 2 rotates in a reverse direction when one wheel 2 rotates in a forward direction. Therefore, if the sign is set, for example, on the basis of the rotation of the right wheel 2R, the right wheel controller 30R may not be provided with the sign adjuster 313 and only the left wheel controller 30L may be provided with the sign adjuster 313.

Here, in the case of determining the auxiliary power provided to the wheel 2 based only on the assist value calculated in the assist calculator 311, the above described problem of downhill turning may occur. Accordingly, in this preferred embodiment, the torque estimator 315, the disturbance value corrector 316, and the disturbance value estimator 317 are provided to estimate a disturbance value corresponding to a road surface condition and correct this disturbance value based on the hand rim operation by the user. Then, the assist value output from the assist limiter 312 is corrected based on the corrected disturbance value to obtain an inclination assist value, and a motor torque in the downhill turning preventing operation is determined based on this inclination assist value. More specifically, the downhill turning preventing operation is performed using the estimated disturbance value as described below.

As shown in FIG. 4, a wheel speed $\omega_R$ of the wheel 2R based on an output from the encoder 24R and a wheel speed $\omega_L$ of the wheel 2L based on an output from the encoder 24L are provided to the right wheel controller 30R, and the torque estimator 315 estimates a torque applied to the wheelchair body (=frame 3+seat 5) based on a difference ($=\omega_R-\omega_L$) between the wheel speeds. Further, an estimated disturbance value $$\hat{d}_{ROT} \hspace{5em} \text{Expression 1}$$

in a turning direction (wheelchair body yaw direction) is obtained by subtracting a difference between the torques applied to the hand rims 13 by the hand rim operation, i.e., a hand rim torque difference ($=T_{RH}-T_{LH}$) and a difference between a motor torque $T_{RM}$ applied to the right wheel 2R from the drive motor 21R and a motor torque $T_{LM}$ applied to the left wheel 2L from the drive motor 21L, i.e., a motor torque difference ($=T_{RM}-T_{LM}$) from the torque estimated in the torque estimator 315.

Note that this is called an estimated disturbance value $d_{ROT}$ hat in this specification.

Here, a disturbance value $$\hat{d}_R \quad \text{Expression 2}$$

of the right wheel 2R may be estimated from an estimated disturbance value $d_{ROT}$ hat in the turning direction.

Note that this is called an estimated disturbance value $d_R$ hat in this specification. The assist value may be corrected using that estimated disturbance value $d_R$ hat. That is, the estimated disturbance value $d_{ROT}$ hat in the turning direction may be provided to the disturbance value estimator 317. However, in the case of executing such a control, if a timing or magnitude of the hand rim operation deviates between the left and right wheels although the user is trying to travel straight, the estimated disturbance value $d_{ROT}$ hat becomes larger, with the result that an assist operation different from the one intended by the user may be performed.

Accordingly, in this preferred embodiment, the assist value is corrected after the estimated disturbance value $d_{ROT}$ hat is corrected according to the hand rim operation in the disturbance value corrector 316 as shown in FIG. 5. Specifically, in the disturbance value corrector 316, it is determined whether or not the user has operated neither one of the hand rims 13L, 13R while the downhill turning preventing operation is performed (Step S11). If neither of the hand rims has been operated, the estimated disturbance value $d_{ROT}$ hat is output as it is to the disturbance value estimator 317. On the other hand, if at least one hand rim 13 has been operated, i.e., ($T_{RH}\neq 0$) or ($T_{LH}\neq 0$), a value obtained by multiplying the estimated disturbance value $d_{ROT}$ hat by a correction coefficient that is a value smaller than "1" and larger than zero, e.g., a value of about 0.5 to about 0.6, is set as a new estimated disturbance value $d_{ROT}$ hat (Step S12) and this is output to the disturbance value estimator 317. Note that the correction coefficient may be set in the nonvolatile memory 32 in advance or may be set through the control terminal 200. Further, the correction coefficient is not limited to about 0.5 to about 0.6. Further, it is not essential that the correction coefficients match on the left and right sides and different values may be set for the left and right sides according to the user's dominant arm, a wheelchair body balance, and other factors.

Then, the disturbance value $d_R$ hat of the right wheel 2R is estimated in the disturbance value estimator 317 and the assist value for the right wheel 2R is corrected using that disturbance value $d_R$ hat to calculate a corrected assist value. Further, also for the left wheel 2L, a disturbance value $$\hat{d}_L \quad \text{Expression 3}$$

is estimated.

Note that this is called an estimated disturbance value $d_L$ hat in this specification. The assist value for the left wheel 2R is corrected using that disturbance value $d_L$ hat to calculate a corrected assist value.

As described above, in this preferred embodiment, the estimated disturbance value $d_{ROT}$ hat in the turning direction is obtained based on the torques $T_{RH}$, $T_{LH}$ applied to the hand rims 13, the motor torques $T_{RM}$, $T_{LM}$ applied to the wheels 2 to assist the travel of the wheelchair 1, and the wheel speeds $\omega_R$, $\omega_L$. In addition, if the user operates at least one of the left and right hand rims 13, the estimated disturbance value $d_{ROT}$ hat is reduced to about 50% to about 60%, for example. Thus, even if a deviation of a timing or magnitude of an input to the hand rim 13 not intended by the user occurs during straight travel, the wheelchair 1 is able to move straight without shaking to the left or right. In this way, the wheelchair 1 is operated in a manner close to the user's intention.

Second Preferred Embodiment

Figure 6:
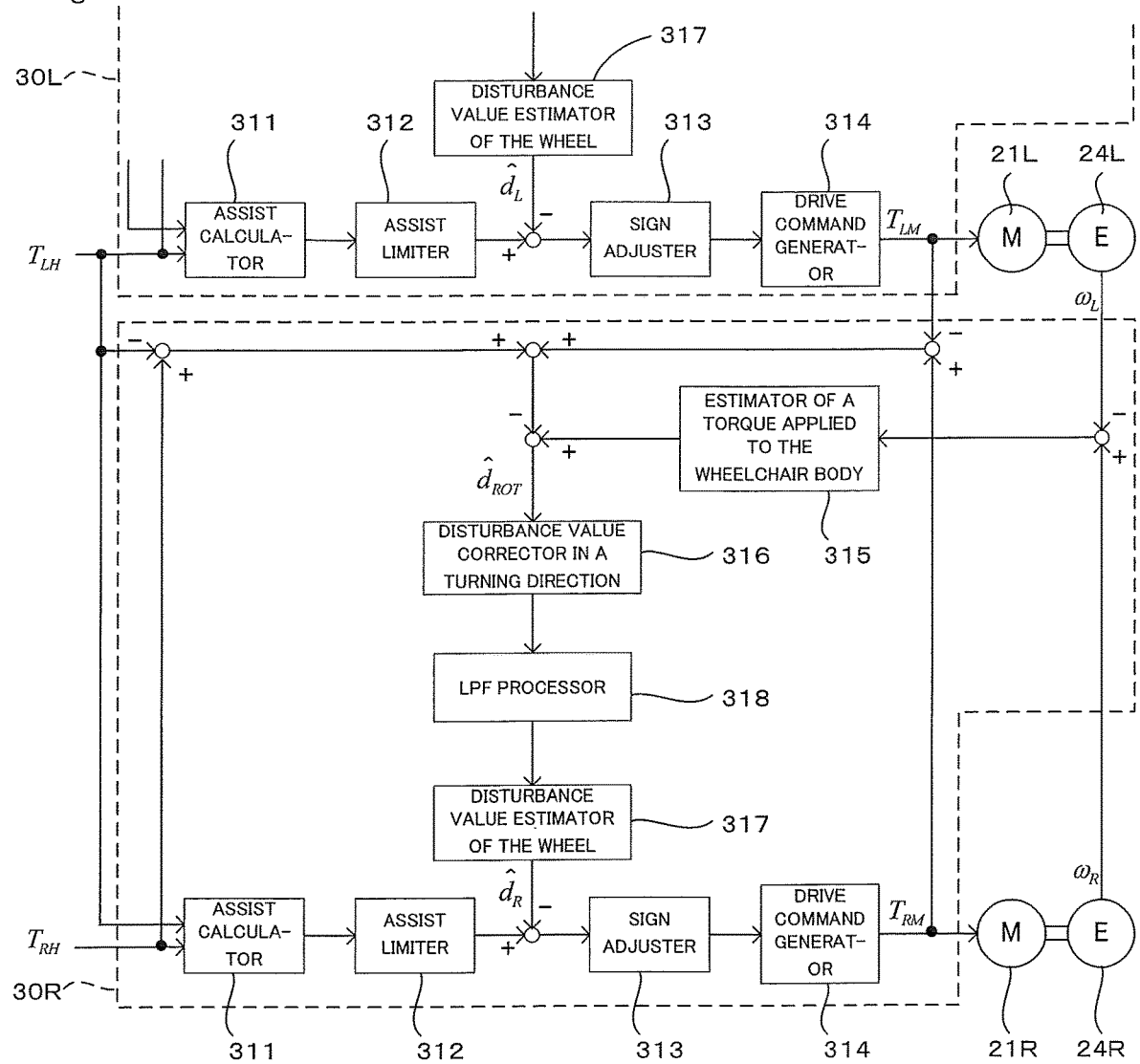
FIG. 6 is a block diagram of a control executed in an electrically assisted wheelchair according to a second preferred embodiment of the present invention.

FIG. 6 is a block diagram of a control executed in an electrically assisted wheelchair according to a second preferred embodiment of the present invention. The second preferred embodiment mainly differs from the first preferred embodiment in that an LPF processor 318 that applies a low pass filter process to an estimated disturbance value $d_{ROT}$ hat output from a disturbance value corrector 316 is added. Note that since the other structure is the same as in the first preferred embodiment, the same components are denoted by the same reference signs and not described.

In the first preferred embodiment, the estimated disturbance value $d_{ROT}$ hat in the turning direction is corrected according to the presence or absence of the hand rim operation by the user. Specifically, the estimated disturbance value $d_{ROT}$ hat is reduced to about half while the hand rim operation is performed. Thus, if the user releases the hand rims 13, the estimated disturbance value $d_{ROT}$ hat immediately returns to an initial value and the wheelchair 1 may undergo a sudden operation change, e.g., a sudden stop.

Accordingly, in the second preferred embodiment, the LPF processor 318 is interposed between the disturbance value corrector 316 and a disturbance value estimator 317 to significantly reduce or prevent a sudden change in the estimated disturbance value $d_{ROT}$ hat as shown in FIG. 6. Particularly, in this preferred embodiment, the low pass filter process represented by the following expression is performed by the LPF processor 318 to correct the estimated disturbance value $d_{ROT}$ hat according to the torques applied to the hand rims 13 and a yaw angular velocity (relative speed of left and right wheels).

$$Y(s) = \frac{1}{\tau s + 1} U(s) \quad \text{Expression 4}$$

$$\tau = \frac{|T_{RH} - T_{LH}|}{A} + \frac{|\omega_R - \omega_L|}{B}$$

wherein Y(s) denotes an estimated disturbance value after the low pass filter processing,
U(s) denotes an estimated disturbance value before the low pass filter processing,
A, B denote constants, and
$\tau$ denotes a time constant.

As described above, according to the second preferred embodiment, the estimated disturbance value in the turning direction is not used as it is, but a value obtained by applying the low pass filter process to this estimated disturbance value with the above time constant is used as the estimated disturbance value $d_{ROT}$ hat in the turning direction. Thus, the wheelchair 1 is smoothly operated by alleviating a large change in the estimated disturbance value at the moment no more input by the hand rim operation is made, in addition to the functions and effects obtained in the above first preferred embodiment.

Third Preferred Embodiment

Figure 7:
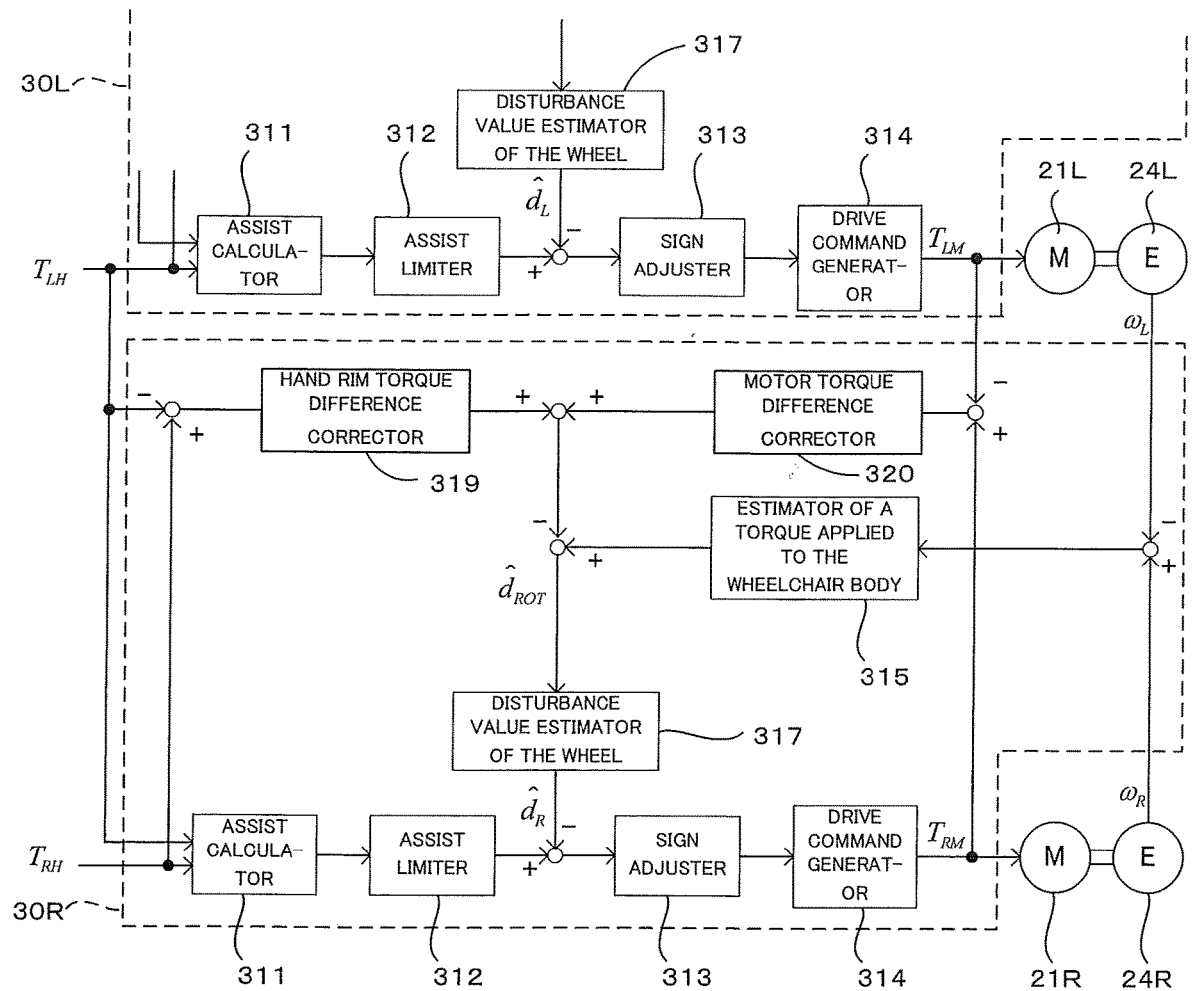
FIG. 7 is a block diagram of a control executed in an electrically assisted wheelchair according to a third preferred embodiment of the present invention.
Figure 8:
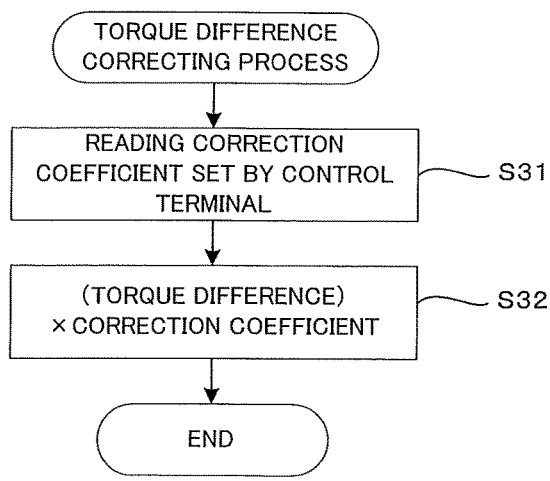
FIG. 8 is a flow chart showing a torque difference correcting process.

FIG. 7 is a block diagram of a control executed in an electrically assisted wheelchair according to a third preferred embodiment of the present invention. Further, FIG. 8 is a flow chart showing a torque difference correcting process. This third preferred embodiment mainly differs from the first preferred embodiment in that a hand rim torque difference and a motor torque difference used to derive an estimated disturbance value $d_{ROT}$ hat are corrected instead of correcting the estimated disturbance value $d_{ROT}$ hat itself. That is, a main controller 31 is provided with a hand rim torque difference corrector 319 and a motor torque difference corrector 320 as shown in FIG. 7.

In the corrector 319, the hand rim torque difference is corrected as shown in FIG. 8. That is, after a correction coefficient set by a control terminal 200 and stored in a nonvolatile memory 32 is read in Step S31, a hand rim torque difference ($=T_{RH}-T_{LH}$) is multiplied by the correction coefficient to correct the hand rim torque difference (Step S32). In this preferred embodiment, the correction coefficient preferably is set at a value smaller than "1" and larger than zero, e.g., about 0.5 to about 0.6, and the hand rim torque difference is decreased by the correcting process. Further, also in the motor torque difference corrector 320, after a correction coefficient set at about 0.5 to about 0.6, for example, is read, a motor torque difference ($=T_{RM}-T_{LM}$) is multiplied by the correction coefficient to correct the motor torque difference similarly to the correcting process in the corrector 319.

These correcting processes are performed for the following reasons. As a deviation of a timing or magnitude of an input by the hand rim operation becomes larger, the hand rim torque difference and the motor torque difference become larger. This may cause the electrically assisted wheelchair 1 to make a motion different from the one intended by a user. Accordingly, the hand rim torque difference and the motor torque difference are made smaller than actual values by performing the above correcting processes. Thus, the hand rim torque difference and the motor torque difference corrected as described above are used to derive the estimated disturbance value $d_{ROT}$ hat, such that the estimated disturbance value $d_{ROT}$ hat also becomes smaller. As a result, functions and effects similar to those of the first preferred embodiment are obtained.

Note that although the correction coefficient is set by the control terminal 200 in this preferred embodiment, the correction coefficient may be set in the nonvolatile memory 32 in advance. Further, the correction coefficients are not limited to about 0.5 to about 0.6. Further, it is not essential that the correction coefficients match on the left and right sides and different values may be set for the left and right sides according to the user's dominant arm, a wheelchair body balance, and other factors.

Further, although the correcting processes are performed for the hand rim torque difference and the motor torque difference in the third preferred embodiment, the correcting process may be performed only for either one of these.

Fourth Preferred Embodiment

Figure 9:
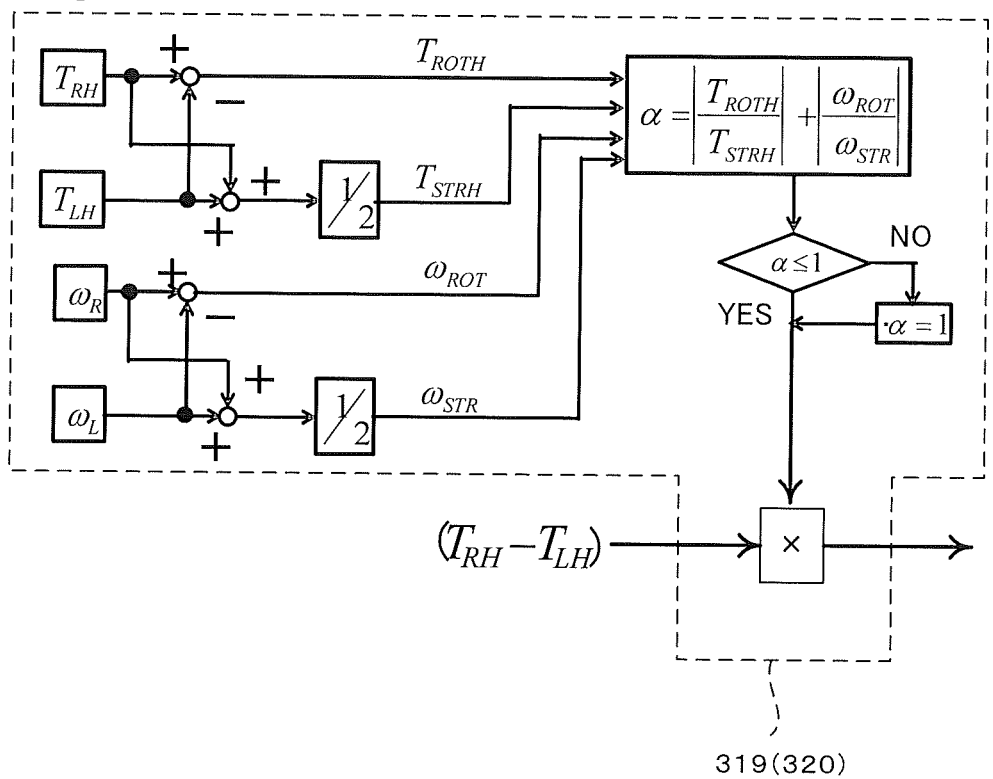
FIG. 9 is a diagram showing a control executed in an electrically assisted wheelchair according to a fourth preferred embodiment of the present invention.

Although the relatively simple correcting process of multiplying the hand rim torque difference by the correction coefficient is performed as shown in FIG. 8 in the third preferred embodiment, the content of the correcting process is not limited to this. For example, a hand rim torque difference corrector 319 may be as shown in FIG. 9. A fourth preferred embodiment is described below with reference to FIG. 9.

FIG. 9 is a diagram showing a control executed in the electrically assisted wheelchair according to the fourth preferred embodiment of the present invention. In this fourth preferred embodiment, as shown in FIG. 9, an input torque $T_{ROTH}$ in a turning direction and an input torque $T_{STRH}$ in a straight direction, among torques input to hand rims 13 by a hand rim operation, are obtained based on the following expressions:

$$T_{ROTH}=(T_{RH}-T_{LH}), \text{ and}$$

$$T_{STRH}=(T_{RH}+T_{LH})/2.$$

Further, a wheel speed $\omega_{ROT}$ in the turning direction and a wheel speed $\omega_{STR}$ in the straight direction are obtained from wheel speeds $\omega_R$, $\omega_L$ based on the following expressions:

$$\omega_{ROTH}=(\omega_{RH}-\omega_{LH}), \text{ and}$$

$$\omega_{STRH}=((\omega_{RH}+\omega_{LH})/2.$$

Note that the input torque $T_{ROTH}$ in the turning direction is equivalent to the hand rim torque difference.

Then, a correction coefficient α is calculated from these four components ($T_{ROTH}$, $T_{STRH}$, $\omega_{ROT}$, $\omega_{STR}$). Here, if the correction coefficient α becomes "1" or larger, the correction coefficient α acts in a direction to make the hand rim torque difference larger. Accordingly, if the calculated correction coefficient α is "1" or larger, the correction coefficient α is forcibly set to "1". On the other hand, if the calculated correction coefficient α is smaller than "1", the calculated correction coefficient α is used as it is.

The correcting process of the hand rim torque difference is executed by multiplying the hand rim torque difference ($T_{RH}-T_{LH}$) by the thus obtained correction coefficient α. Thus, the hand rim torque difference corrected as described above is used to derive an estimated disturbance value $d_{ROT}$ hat also in the fourth preferred embodiment, such that the estimated disturbance value $d_{ROT}$ hat also becomes smaller, and functions and effects similar to those of the first preferred embodiment are obtained. Further, since the correction coefficient α is derived from the input torque $T_{ROTH}$ in the turning direction, the input torque $T_{STRH}$ in the straight direction, the wheel speed $\omega_{ROT}$ in the turning direction, and the wheel speed $\omega_{STR}$ in the straight direction, the hand rim torque difference is corrected more accurately than in the third preferred embodiment. As a result, the wheelchair 1 is smoothly operated by alleviating a large change in the estimated disturbance value.

Note that although the correcting process using the correction coefficient α is performed only in the hand rim torque difference corrector 319 in the fourth preferred embodiment, a correcting process using the correction coefficient α may be performed also in the motor torque difference corrector 320. Further, the correcting process using the correction coefficient α may be performed in both the hand rim torque difference corrector 319 and the motor torque difference corrector 320.

Fifth Preferred Embodiment

Figure 10:
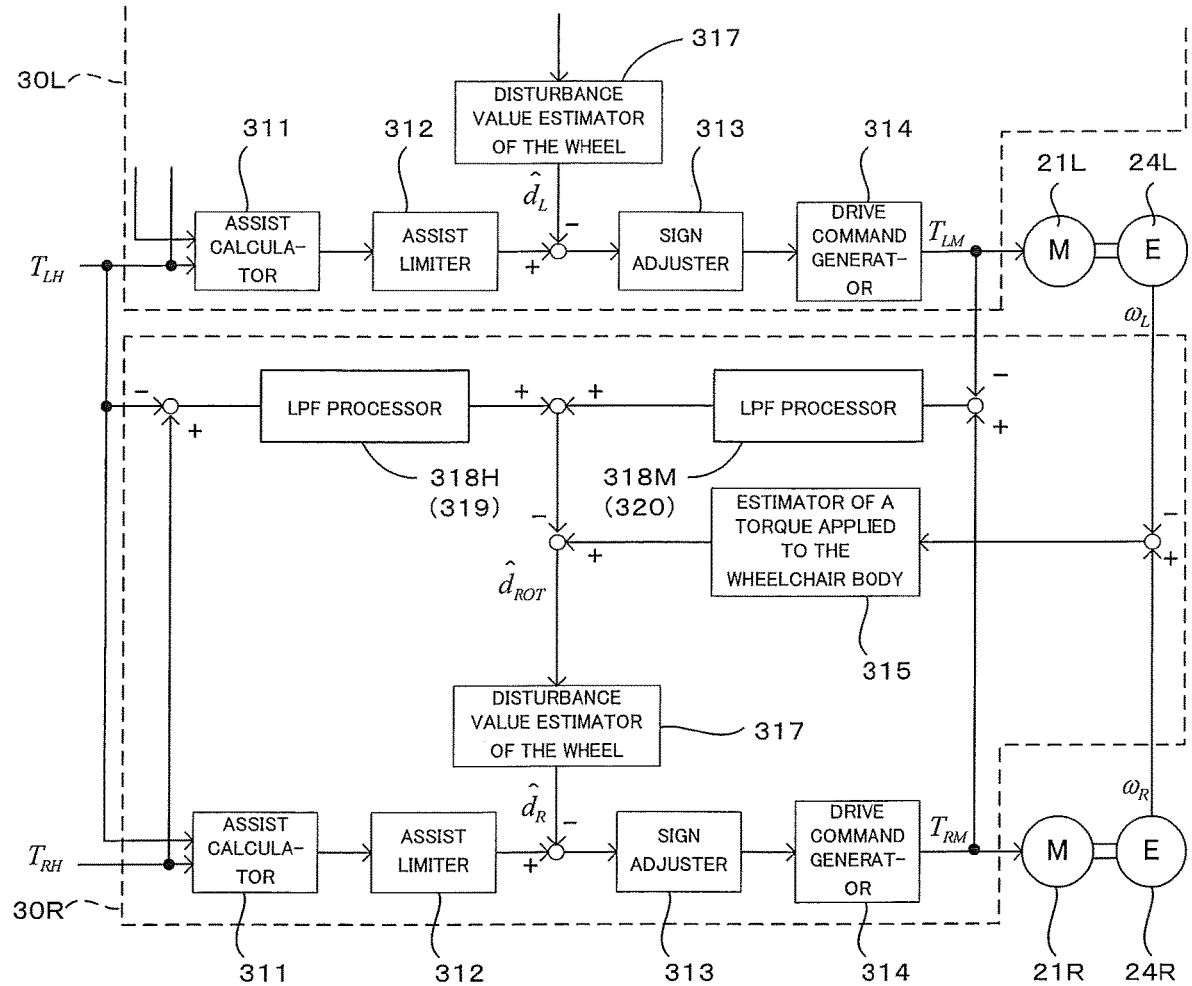
FIG. 10 is a diagram showing a control executed in an electrically assisted wheelchair according to a fifth preferred embodiment of the present invention.

Although the hand rim torque difference and the motor torque difference are corrected to be smaller by being multiplied by the correction coefficients in the third and fourth preferred embodiments, LPF processors 318H, 318M may be respectively provided as the correctors 319, 320 as shown in FIG. 10. For example, by providing the LPF processor 318H as the corrector 319, a low pass filter process similar to that of the LPF processor 318 of the second preferred embodiment is performed in the LPF processor 318H. Note that, here, Y(s) denotes a hand rim torque difference after the low pass filter process, and U(s) denotes a hand rim torque difference before the low pass filter process, and an estimated disturbance value $d_{ROT}$ hat is derived using a value obtained by applying the low pass filter process to the hand rim torque difference with the above time constant τ. Thus, functions and effects similar to those of the first preferred embodiment are obtained by providing the LPF processor 318H as the corrector 319. Concerning this point, the same applies also in the case of providing the LPF processor 318M as the corrector 320. Note that although the LPF processors 318H, 318M are provided in a fifth preferred embodiment shown in FIG. 10, only either one of these may be provided.

In the above first to fifth preferred embodiments, the specific configurations for making the estimated disturbance value $d_{ROT}$ hat smaller according to the hand rim operation are different from each other. Here, those specific configurations are summarized for the convenience of description.

First preferred embodiment: disturbance value correcting process after estimation (this is referred to as a "configuration A").

Second preferred embodiment: low pass filter processing after estimation (this is referred to as a "configuration B").

Third preferred embodiment: first correcting process of torque differences before estimation (this is referred to as a "configuration C").

Fourth preferred embodiment: second correcting process of torque differences before estimation (this is referred to as a "configuration D").

Fifth preferred embodiment: third correcting process of torque differences before estimation (this is referred to as a "configuration E").

These configurations can be combined as appropriate. For example, the configurations A, B, and C may be combined as shown in FIG. 11, and the wheelchair 1 is smoothly operated in a manner close to the user's intention by the synergetic effects of those configurations.

Figure 11:
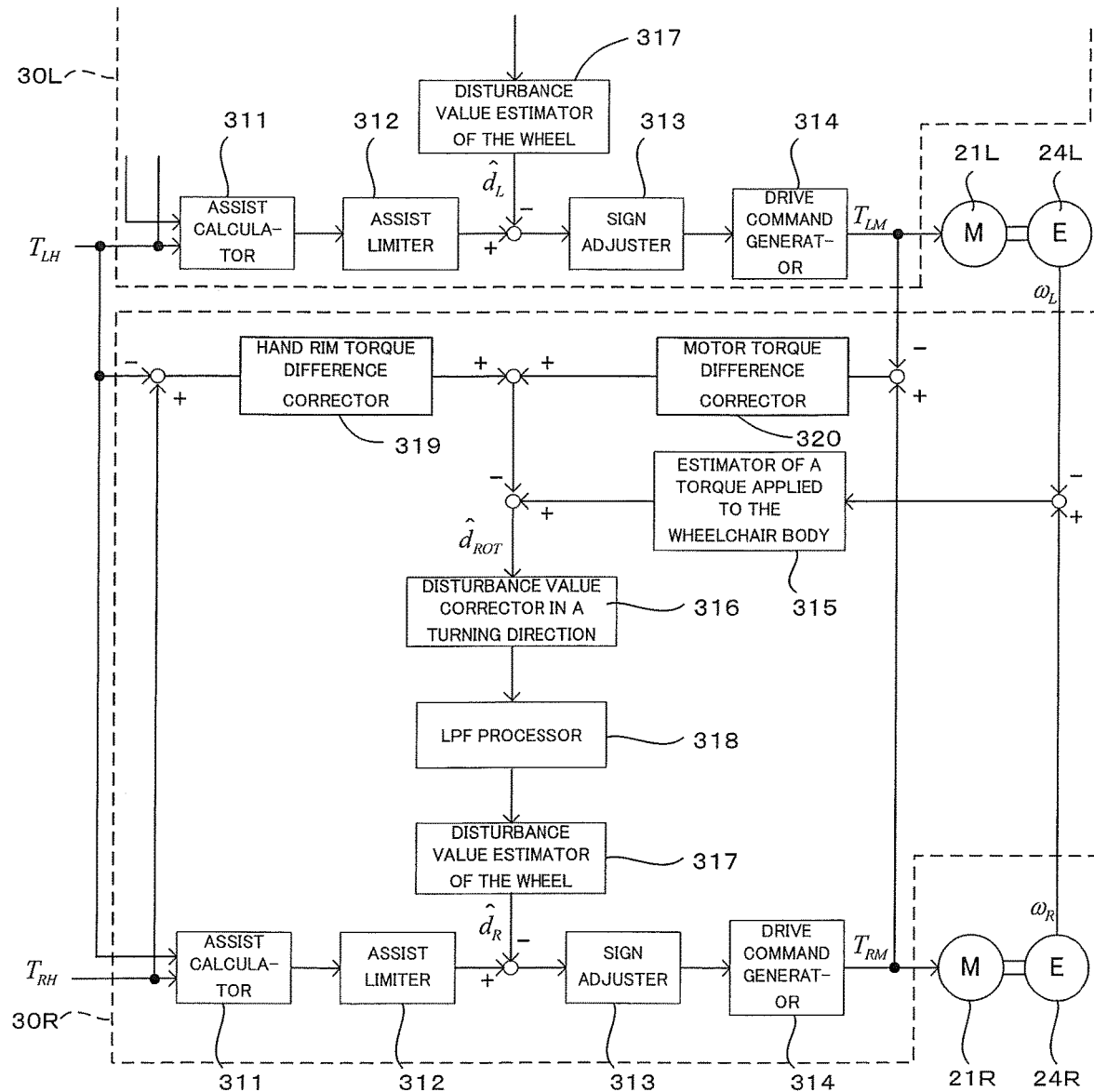
FIG. 11 is a diagram showing a control executed in an electrically assisted wheelchair according to a sixth preferred embodiment of the present invention.

Note that the combination of the above configurations is not limited to the one shown in FIG. 11 and functions and effects similar to those of a sixth preferred embodiment shown in FIG. 11 are also obtained, for example, in the following combinations.

Configuration A+Configuration B+Configuration D
Configuration A+Configuration B+Configuration E
Configuration A+Configuration D
Configuration A+Configuration E Seventh Preferred Embodiment Although the wheelchair 1 performs the downhill turning preventing operation by estimating the disturbance value as described above in the above first to sixth preferred embodiments, applications of various preferred embodiments of the present invention are not limited to this and the preferred embodiments of the present invention may be applied to wheelchairs 1 that perform the downhill turning preventing operation without estimating the disturbance value. Here, "to perform the downhill turning preventing operation by estimating the disturbance value" includes generating a wheelchair model based on the hand rim torques input via the hand rims 13 and a movement (wheel speeds) of the wheelchair 1 at that time, estimating a force other than the input torques, i.e., the disturbance value, obtaining the inclination assist value by correcting the assist value by this estimated disturbance value and preventing the downhill turning by an assist control based on this inclination assist value as described in the above first to sixth preferred embodiments. In contrast, "to perform the downhill turning preventing operation without estimating the disturbance value" includes obtaining the inclination assist value by correcting the assist value by feedforward and feedback controls described, for example, in JP 2015-27185A, and preventing the downhill turning by an assist control based on this inclination assist value. A seventh preferred embodiment of the present invention including a wheelchair 1 that performs the downhill turning preventing operation without estimating the disturbance value is described below with reference to FIGS. 12 and 13.

Figure 12:
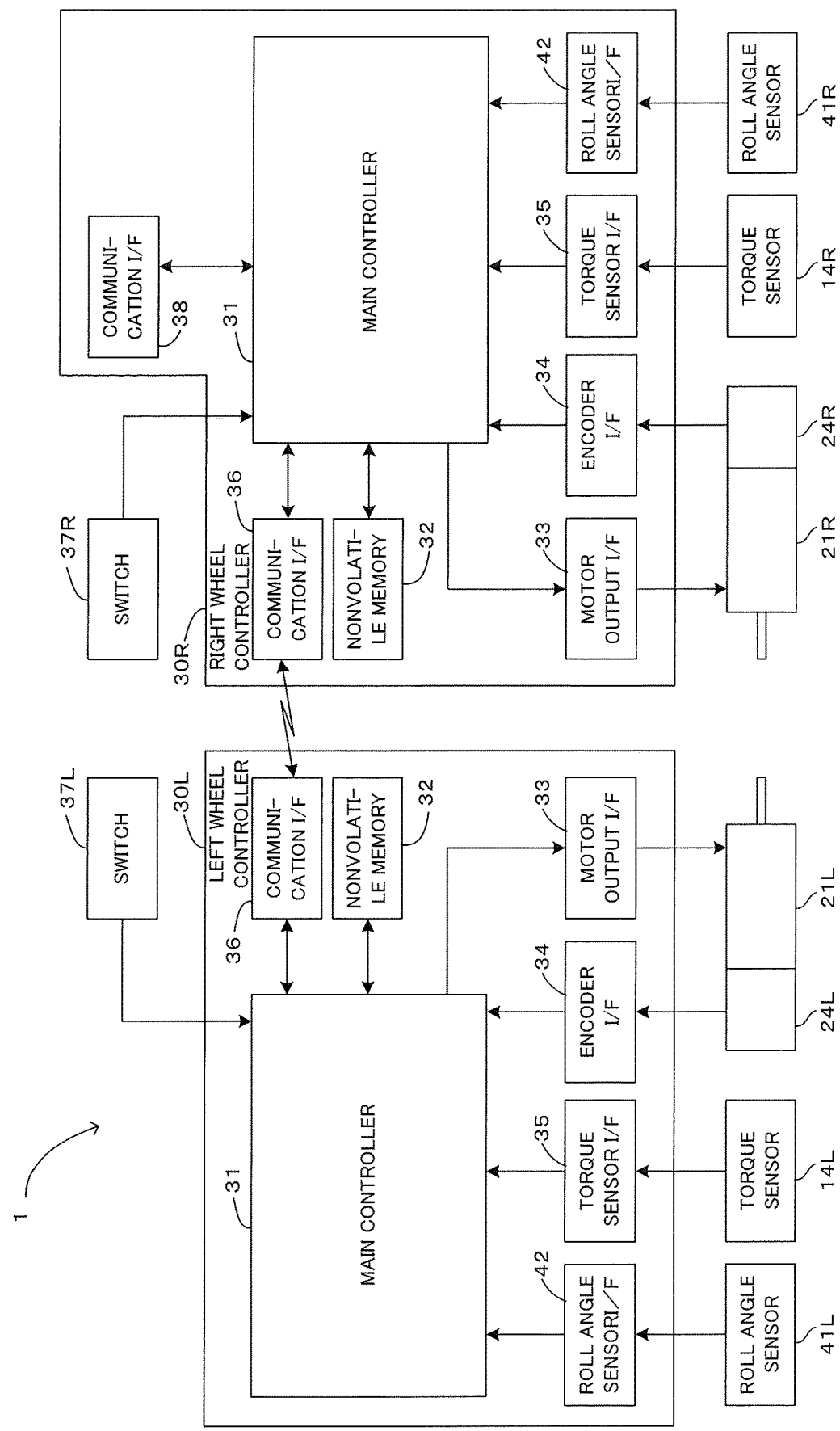
FIG. 12 is a block diagram showing an electrical configuration according to a seventh preferred embodiment of the present invention.

FIG. 12 is a block diagram showing an electrical configuration of the seventh preferred embodiment. As is clear from the comparison of FIG. 12 (seventh preferred embodiment) and FIG. 3 (first preferred embodiment), the wheelchair 1 according to the seventh preferred embodiment mainly differs from the first preferred embodiment in that roll angle sensors 41L, 41R that detect roll angles when a wheelchair body 3 rotates about a roll axis to be inclined are added, and the other electrical configurations are the same as in the first preferred embodiment. However, in the seventh preferred embodiment, the downhill turning is prevented by correcting the assist value by a feedforward control and a feedback control, such that the control method is substantially different.

Figure 13:
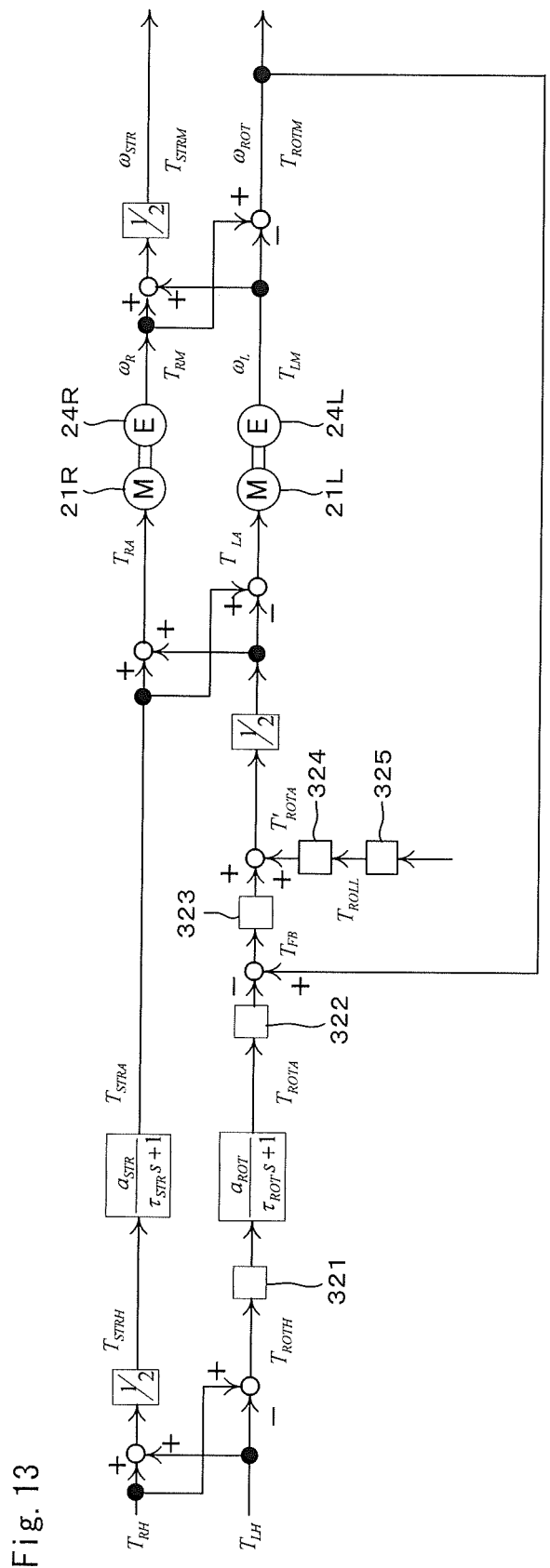
FIG. 13 is a block diagram of a control executed by the electrically assisted wheelchair shown in FIG. 12.

FIG. 13 is a block diagram of a control executed by the electrically assisted wheelchair shown in FIG. 12. In each wheel controller 30R, 30L, a main controller 31 performs various calculation processes based on a program and data stored in a nonvolatile memory 32. The wheelchair 1 is entirely controlled by both main controllers 31. Here, to facilitate the understanding of the seventh preferred embodiment, the contents of a basic assist control by both main controllers 31 are described, excluding other characteristic features (first corrector 321 that corrects a hand rim torque difference, second corrector 322 that corrects an assist torque in a turning direction, third corrector 323 that corrects the assist torque in the turning direction after the feedback control, and fourth corrector 324 that further corrects an inclined surface correction value). Thereafter, the contents of adjustments made by the first to fourth correctors 321 to 324 are described.

As shown in FIG. 13, the main controller 31 obtains an input torque $T_{STRH}$ in a straight direction and an input torque $T_{ROTH}$ in the turning direction based on torques $T_{RH}$, $T_{LH}$ input to the hand rims 13 by a hand rim operation. Specifically, the input torques $T_{STRH}$, $T_{ROTH}$ are obtained by the following expressions:

$$T_{STRH} = (T_{RH} + T_{LH})/2$$

$$T_{ROTH} = (T_{RH} - T_{LH}).$$

Further, for the straight direction, the input torque $T_{STRH}$ is multiplied by the following function to obtain an assist torque $T_{STRA}$ in the straight direction:

$$\frac{a_{STR}}{\tau_{STR}s + 1} \quad \text{Expression 5}$$

where $\alpha_{STR}$: straight direction assist rate, and
$\tau_{STR}$: time constant for straight direction assist torque.

Further, for the turning direction, the input torque $T_{ROTH}$ is multiplied by the following function to obtain an assist torque $T_{ROTA}$ in the turning direction.

$$\frac{a_{ROT}}{\tau_{ROT}s+1} \qquad \text{Expression 6}$$

where $\alpha_{ROT}$: turning direction assist rate, and
$\tau_{ROT}$: time constant for turning direction assist torque.

Further, for the turning direction, the assist torque $T_{ROTA}$ is subtracted from a current motor torque $T_{ROTM}$ in the turning direction. This motor torque $T_{ROTM}$ is a difference (=$T_{RM}$-$T_{LM}$) between motor torques $T_{RM}$, $T_{LM}$ provided to wheels 2 to assist the travel of the wheelchair 1.

Further, the assist torque in the turning direction is feedforward corrected by adding an inclined surface correction value $T_{ROLL}$ to an assist torque $T_{FB}$ in the turning direction after the feedback obtained by the feedback correction of the assist torque in the turning direction based on the motor torque $T_{ROTM}$ as described above. An inclined surface corrector 325 calculates a force falling with gravity from an inclination direction of a road surface and an angle of inclination based on a roll angle θ of the wheelchair body (=frame 3+seat 5) detected by the roll angle sensors 41L, 41R, and a motor torque (motor output adjustment value) to correct this force is output as the inclined surface correction value $T_{ROLL}$.

Further, an assist torque $T_{RA}$ of the right wheel 2R and an assist torque $T_{LA}$ of the left wheel 2L are obtained based on a half value of an assist torque $T'_{ROTA}$ in the turning direction obtained by the feedforward correction of the assist torque in the turning direction using the inclined surface correction value $T_{ROLL}$ and the assist torque $T_{STRA}$ in the straight direction. Specifically, the assist torques $T_{RA}$, $T_{LA}$ are determined by the following expressions and the drive motors 21 are driven:

$T_{RA}=T_{STRA}+(T'_{ROTA}/2)$, and $T_{LA}=T_{STRA}-(T'_{ROTA}/2)$.

In this way, the downhill turning preventing operation is performed by adding the feedback control and the feedforward control.

However, also in the wheelchair 1 described above, as a deviation of a timing or magnitude of an input by the hand rim operation becomes larger, the hand rim torque difference and the motor torque difference become larger and a motion different from the one intended by a user is possible.

Accordingly, in the seventh preferred embodiment, similarly to the corrector 319 of the third preferred embodiment, the first corrector 321 corrects the input torque $T_{ROTH}$ in the turning direction by multiplying the input torque $T_{ROTH}$ in the turning direction by a correction coefficient after reading the correction coefficient set by a control terminal 200 and stored in the nonvolatile memory 32. In this preferred embodiment, the correction coefficient is set at a value smaller than "1" and larger than zero, e.g., about 0.5 to about 0.6, and the input torque $T_{ROTH}$ in the turning direction is decreased by the correcting process.

This correcting process is performed for the following reasons. As a deviation of a timing or magnitude of an input by the hand rim operation becomes larger, the hand rim torque difference, i.e., the input torque $T_{ROTH}$ in the turning direction, becomes larger. This may cause the electrically assisted wheelchair 1 to make a motion different from the one intended by the user. Accordingly, the assist torque $T'_{ROTA}$ in the turning direction is also decreased by making the input torque $T_{ROTH}$ in the turning direction smaller than an actual value by the correcting process in the first corrector 321. As a result, functions and effects similar to those of the first preferred embodiment are obtained.

Further, in the seventh preferred embodiment, similarly to the corrector 319 of the third preferred embodiment, the second corrector 322 corrects the assist torque $T_{ROTA}$ in the turning direction by multiplying the assist torque $T_{ROTA}$ in the turning direction before the feedback control, i.e., a difference between the assist torques of the left and right wheels 2 by a correction coefficient after reading the correction coefficient set by the control terminal 200 and stored in the nonvolatile memory 32. In this preferred embodiment, the correction coefficient is set at a value smaller than "1" and larger than zero, e.g., about 0.5 to about 0.6, and the assist torque $T_{ROTA}$ in the turning direction is decreased by the correcting process. As a result, functions and effects similar to those of the first corrector 321 are obtained.

Further, in the seventh preferred embodiment, the third corrector 323 corrects the assist torque $T_{FB}$ by multiplying the assist torque $T_{FB}$ in the turning direction after the feedback by a correction coefficient after reading the correction coefficient set by the control terminal 200 and stored in the nonvolatile memory 32. In this preferred embodiment, the correction coefficient is set at a value smaller than "1" and larger than zero, e.g., about 0.5 to about 0.6, and the assist torque $T_{FB}$ in the turning direction after the feedback is decreased by the correcting process. As a result, functions and effects similar to those of the first corrector 321 are obtained.

Further, in the seventh preferred embodiment, the fourth corrector 324 corrects the inclined surface correction value $T_{ROLL}$ by multiplying the inclined surface correction value $T_{ROLL}$ by a correction coefficient after reading the correction coefficient set by the control terminal 200 and stored in the nonvolatile memory 32. In this preferred embodiment, the correction coefficient is set at a value smaller than "1" and larger than zero, e.g., about 0.5 to about 0.6, and the inclined surface correction value $T_{ROLL}$ is decreased by the correcting process. As a result, functions and effects similar to those of the first corrector 321 are obtained.

As just described, in the seventh preferred embodiment, the assist torques $T'_{ROTA}$, $T_{FB}$ in the turning direction correspond to an "inclination assist value," and the inclination assist value is corrected according to the hand rim operation by providing the first to fourth correctors 321 to 324. However, only some of the first to fourth correctors 321 to 324 may be provided. In short, the wheelchair 1 is operated in a manner close to the user's intention by providing at least one of the first to fourth correctors 321 to 324.

Eighth Preferred Embodiment

In the above seventh preferred embodiment, the first to fourth correctors 321 to 324 perform the relatively simple correcting processes of multiplying the correction target (input torque $T_{ROTH}$ in the turning direction, assist torque $T_{ROTA}$ in the turning direction before the feedback control, assist torque $T_{FB}$ in the turning direction after the feedback, inclined surface correction value $T_{ROLL}$) by a correction coefficient as shown in FIG. 13. However, the correcting processes are not limited to these. For example, as in the fourth preferred embodiment, the correction coefficient α may be calculated from four components ($T_{ROTH}$, $T_{STRH}$, $\omega_{ROT}$, $\omega_{STR}$) and the correction target may be corrected based on this correction coefficient α. Note that, also in the eighth preferred embodiment, it is not an essential requirement to provide all of the first to fourth correctors 321 to 324 and the wheelchair 1 is still be operated in a manner close to the user's intention by providing at least one of these.

Ninth Preferred Embodiment

Although the correction target is decreased by being multiplied by the correction coefficient in the seventh and eighth preferred embodiments, LPF processors may be respectively provided as the first to fourth correctors 321 to 324 as in the fifth preferred embodiment. Further, also in the ninth preferred embodiment, it is not an essential requirement to provide all of the first to fourth correctors 321 to 324 and the wheelchair 1 is still operated in a manner close to the user's intention by providing at least one of these.

Note that the present invention is not limited to the above preferred embodiments and various changes can be made to the above preferred embodiments without departing from the gist of the present invention, and the present invention may further include the following changes.

In the above first to sixth preferred embodiments, the right wheel 2R is controlled by the right wheel controller 30R and the left wheel 2L is controlled by the left wheel controller 30L. However, the above controls may be executed by the right wheel controller 30R and only operation commands to the motors may be shared. On the other hand, in the above seventh to ninth preferred embodiments, each of the left and right wheel controllers 30 may execute the control shown in FIG. 13 as in the first to sixth preferred embodiments.

Although the feedback control and the feedforward control are combined in the above seventh to ninth preferred embodiments, the present invention may be applied to electrically assisted wheelchairs that perform the downhill turning preventing operation by executing either one of these controls.

Although the correction coefficients are set, for example, at about 0.5 to about 0.6 in the above preferred embodiments, the correction coefficients are not limited to these and not all the correction coefficients necessarily need to match and may be appropriately set by the control terminal 200 or the like.

As described above, in the above preferred embodiments, the frame 3 on which the seat 5 is mounted corresponds to an example of a "wheelchair body." Further, the drive motors 21R, 21L respectively correspond to examples of a "right drive" and a "left drive." Further, the disturbance value correction by the disturbance value corrector 316, correcting the hand rim torque difference by the corrector 319, correcting the motor torque difference by the corrector 320, the low pass filter processing by the LPF processors 318, 318H, and 318M, correcting the hand rim torque difference by the first corrector 321, correcting the assist torque in the turning direction by the second corrector 322, correcting the assist torque in the turning direction after the feedback control by the third corrector 323, and correcting the inclined surface correction value by the fourth corrector 324 correspond to examples of a "correcting an assist value based on a hand rim operation." Furthermore, the roll angle sensors 41R, 41L correspond to an example of a "roll angle detector."

As the specified preferred embodiments have been illustrated and described above, the present invention may be changed as follows.

A controller estimates a disturbance value in a turning direction of the wheelchair body based on a difference between torques applied to the right hand rim and the left hand rim by the hand rim operation, a difference between the left auxiliary power and the right auxiliary power and a yaw angular velocity of the wheelchair body, and obtains the inclination assist value by correcting the assist value based on the disturbance value; and makes the disturbance value smaller when the hand rim operation is present.

The controller corrects the disturbance value based on the presence or absence of the hand rim operation.

The controller applies a low pass filter processing to the corrected disturbance value based on the difference between the torques applied to the right hand rim and the left hand rim by the hand rim operation and the yaw angular velocity of the wheelchair body.

The controller corrects the disturbance value by correcting at least one of the difference between the torques applied to the right hand rim and the left hand rim and the difference between the right auxiliary power and the left auxiliary power.

The controller makes a correction by multiplying at least one of the difference between the torques applied to the right hand rim and the left hand rim and the difference between the right auxiliary power and the left auxiliary power by a correction coefficient smaller than 1 and larger than zero.

The controller calculates a correction coefficient equal to or smaller than 1 and larger than zero based on the torque applied to the right hand rim, the torque applied to the left hand rim, the right auxiliary power, and the left auxiliary power; and makes a correction by multiplying at least one of the difference between the torques applied to the right hand rim and the left hand rim and the difference between the right auxiliary power and the left auxiliary power by the correction coefficient.

The controller applies a low pass filter processing to at least one of the difference between the torques applied to the right hand rim and the left hand rim and the difference between the right auxiliary power and the left auxiliary power based on the difference between the torques applied to the right hand rim and the left hand rim by the hand rim operation and the yaw angular velocity of the wheelchair body.

The controller obtains the inclination assist value by feedback controlling the assist value using wheel speeds in a turning direction; and corrects at least one of a difference between torques applied to the right hand rim and the left hand rim, a difference between the right auxiliary power and the left auxiliary power, and the feedback controlled assist value.

A roll angle detector is provided which detects a roll angle of the wheelchair body, and the controller obtains the inclination assist value by feedforward controlling the assist value based on an inclined surface correction value corresponding to the roll angle detected by the roll angle detector; and corrects at least one of a difference between torques applied to the right hand rim and the left hand rim, a difference between the right auxiliary power and the left auxiliary power, and the inclined surface correction value.

Preferred embodiments of the present invention may be applied to electrically assisted wheelchairs that assist the travel of the wheelchair according to the operation of hand rims of left and right wheels by a user and control methods therefor in general.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An electrically assisted wheelchair comprising:
a wheelchair body including a seat on which a user sits;
a right drive that applies right auxiliary power to a right wheel by an operation of a right hand rim by the user;
a left drive that applies left auxiliary power to a left wheel by operation of a left hand rim by the user; and
a controller configured or programmed to calculate an assist value for the right wheel and the left wheel and determine the right auxiliary power and the left auxiliary power; wherein
the controller is configured or programmed to:
obtain an inclination assist value by correcting the assist value when a road surface is inclined in a left-right direction of the seat and perform a downhill turning preventing operation to cause the wheelchair body to travel straight by applying the right auxiliary power and the left auxiliary power corresponding to the inclination assist value; and
adjust the right auxiliary power and the left auxiliary power by correcting the inclination assist value based on a hand rim operation of the user to operate at least one of the right hand rim and the left hand rim in the downhill turning preventing operation.

2. The electrically assisted wheelchair according to claim 1, wherein the controller is configured or programmed to:
estimate a disturbance value in a turning direction of the wheelchair body based on a difference between torques applied to the right hand rim and the left hand rim by the hand rim operation, estimate a difference between the left auxiliary power and the right auxiliary power and a yaw angular velocity of the wheelchair body, and obtain the inclination assist value by correcting the assist value based on the disturbance value; and
decrease the disturbance value when the hand rim operation is present.

3. The electrically assisted wheelchair according to claim 2, wherein the controller is configured or programmed to correct the disturbance value based on a presence or an absence of the hand rim operation.

4. The electrically assisted wheelchair according to claim 3, wherein the controller is configured or programmed to apply a low pass filter processing to the corrected disturbance value based on the difference between the torques applied to the right hand rim and the left hand rim by the hand rim operation and the yaw angular velocity of the wheelchair body.

5. The electrically assisted wheelchair according to claim 2, wherein the controller is configured or programmed to correct the disturbance value by correcting at least one of the difference between the torques applied to the right hand rim and the left hand rim and the difference between the right auxiliary power and the left auxiliary power.

6. The electrically assisted wheelchair according to claim 5, wherein the controller is configured or programmed to make a correction by multiplying at least one of the difference between the torques applied to the right hand rim and the left hand rim and the difference between the right auxiliary power and the left auxiliary power by a correction coefficient smaller than 1 and larger than zero.

7. The electrically assisted wheelchair according to claim 5, wherein the controller is configured or programmed to:
calculate a correction coefficient equal to or smaller than 1 and larger than zero based on the torque applied to the right hand rim, the torque applied to the left hand rim, the right auxiliary power, and the left auxiliary power; and
make a correction by multiplying at least one of the difference between the torques applied to the right hand rim and the left hand rim and the difference between the right auxiliary power and the left auxiliary power by the correction coefficient.

8. The electrically assisted wheelchair according to claim 5, wherein the controller is configured or programmed to apply a low pass filter processing to at least one of the difference between the torques applied to the right hand rim and the left hand rim and the difference between the right auxiliary power and the left auxiliary power based on the difference between the torques applied to the right hand rim and the left hand rim by the hand rim operation and the yaw angular velocity of the wheelchair body.

9. The electrically assisted wheelchair according to claim 1, wherein the controller is configured or programmed to:
obtain the inclination assist value by feedback controlling the assist value using wheel speeds in a turning direction; and
correct at least one of a difference between torques applied to the right hand rim and the left hand rim, a difference between the right auxiliary power and the left auxiliary power, and the feedback controlled assist value.

10. The electrically assisted wheelchair according to claim 9, further comprising a roll angle detector that detects a roll angle of the wheelchair body; wherein
the controller is configured or programmed to:
obtain the inclination assist value by feedforward controlling the assist value based on an inclined surface correction value corresponding to the roll angle detected by the roll angle detector; and
correct at least one of the difference between the torques applied to the right hand rim and the left hand rim, the difference between the right auxiliary power and the left auxiliary power, the feedback controlled assist value, and the inclined surface correction value.

11. The electrically assisted wheelchair according to claim 1, further comprising a roll angle detector that detects a roll angle of the wheelchair body; wherein
the controller is configured or programmed to:
obtain the inclination assist value by feedforward controlling the assist value based on an inclined surface correction value corresponding to the roll angle detected by the roll angle detector; and
correct at least one of a difference between torques applied to the right hand rim and the left hand rim, a difference between the right auxiliary power and the left auxiliary power, and the inclined surface correction value.

12. A control method for an electrically assisted wheelchair that assists a travel of a wheelchair body by calculating an assist value based on an operation of a right hand rim and a left hand rim by a user seated on a seat and respectively applying right auxiliary power and left auxiliary power corresponding to the assist value to a right wheel and a left wheel, the method comprising:
obtaining an inclination assist value by correcting the assist value when a road surface is inclined in a left-right direction of the seat;
performing a downhill turning preventing operation to cause the wheelchair body to travel straight on the inclined road surface by applying the right auxiliary power and the left auxiliary power corresponding to the inclination assist value; and correcting the inclination assist value based on a hand rim operation of the user to operate at least one of the right hand rim and the left hand rim in the downhill turning preventing operation.

\* \* \* \* \*